United States Patent
Venkataramani et al.

(10) Patent No.: US 10,824,369 B2
(45) Date of Patent: Nov. 3, 2020

(54) ELASTIC METHOD OF REMOTE DIRECT MEMORY ACCESS MEMORY ADVERTISEMENT

(71) Applicant: Nutanix, Inc., San Jose, CA (US)

(72) Inventors: Hema Venkataramani, San Jose, CA (US); Peter Scott Wyckoff, Durham, NC (US)

(73) Assignee: Nutanix, Inc., San Jose, CA (US)

( * ) Notice: Subject to any disclaimer, the term of this patent is extended or adjusted under 35 U.S.C. 154(b) by 224 days.

(21) Appl. No.: 16/051,229

(22) Filed: Jul. 31, 2018

(65) Prior Publication Data

US 2020/0042475 A1    Feb. 6, 2020

(51) Int. Cl.
*G06F 3/06* (2006.01)
*G06F 13/28* (2006.01)
*G06F 15/173* (2006.01)

(52) U.S. Cl.
CPC ............ *G06F 3/0656* (2013.01); *G06F 3/061* (2013.01); *G06F 3/067* (2013.01); *G06F 3/0644* (2013.01);
(Continued)

(58) Field of Classification Search
CPC ...... G06F 3/0602; G06F 3/0608; G06F 3/061; G06F 3/0629; G06F 3/0644; G06F 3/0656; G06F 3/067; G06F 2003/0691; G06F 5/065; G06F 5/10; G06F 13/1673; G06F 13/28; G06F 15/1731; G06F 2205/063; G06F 2213/2806
See application file for complete search history.

(56) References Cited

U.S. PATENT DOCUMENTS 5,289,470 A * 2/1994 Chang ................. G06F 12/023
                                                              379/88.28
5,784,698 A * 7/1998 Brady ................. G06F 12/023
                                                              710/56
(Continued)

OTHER PUBLICATIONS

Koh, Kwangwon, et al. "Disaggregated Cloud Memory with Elastic Block Management". IEEE Transactions on Computers. vol. 68, No. 1. Jan. 2019. IEEE. (Year: 2019).*
(Continued)

*Primary Examiner* — Thomas J. Cleary
(74) *Attorney, Agent, or Firm* — Vista IP Law Group, LLP

(57) ABSTRACT

Systems and methods for demand-based remote direct memory access buffer management. A method embodiment commences upon initially partitioning a memory pool at a computer that is to receive memory contents from a sender. The memory pool is partitioned into memory areas that comprise a plurality of different sized buffers that serve as target buffers for one or more direct memory access data transfer operations from the data sources. An initial first set of buffer apportionments are associated with each one of the one or more data sources and those initial sets are advertised to the corresponding data sources. Over time, based on messages that have been loaded into the receiver's memory, the payload sizes of the messages are observed. Based on the observed the demand for buffers that are used for the message payload, the constituency of the advertised buffers can grow or shrink elastically as compared to previous advertisements.

24 Claims, 12 Drawing Sheets

(52) U.S. Cl.
CPC ........ *G06F 13/28* (2013.01); *G06F 15/17331* (2013.01); *G06F 2003/0691* (2013.01); *G06F 2213/2806* (2013.01)

(56) References Cited

U.S. PATENT DOCUMENTS

| | | | | |
|---|---|---|---|---|
| 5,907,717 | A * | 5/1999 | Ellis | H04L 12/433 |
| | | | | 370/360 |
| 5,916,309 | A * | 6/1999 | Brown | G06F 5/065 |
| | | | | 710/52 |
| 5,920,732 | A * | 7/1999 | Riddle | H04L 49/9026 |
| | | | | 710/52 |
| 5,961,606 | A * | 10/1999 | Talluri | H04L 49/90 |
| | | | | 709/228 |
| 6,046,817 | A * | 4/2000 | Brown | G06F 5/065 |
| | | | | 358/1.15 |
| 6,088,777 | A * | 7/2000 | Sorber | G06F 12/023 |
| | | | | 370/381 |
| 7,047,312 | B1 * | 5/2006 | Aweya | H04L 1/1832 |
| | | | | 370/231 |
| 7,146,466 | B2 * | 12/2006 | Craft | G06F 12/0888 |
| | | | | 711/133 |
| 7,307,998 | B1 * | 12/2007 | Wang | H04L 49/90 |
| | | | | 370/412 |
| 7,620,693 | B1 * | 11/2009 | Mott | H04L 47/621 |
| | | | | 709/213 |
| 7,694,043 | B2 * | 4/2010 | Russ | G06F 13/124 |
| | | | | 710/52 |
| 7,738,451 | B2 * | 6/2010 | Chien | H04L 49/90 |
| | | | | 370/381 |
| 8,015,385 | B2 * | 9/2011 | Schopp | G06F 12/023 |
| | | | | 711/170 |
| 8,234,421 | B2 * | 7/2012 | Leaming | G06F 13/385 |
| | | | | 710/52 |
| 8,307,174 | B1 * | 11/2012 | Misra | G06F 3/0617 |
| | | | | 711/161 |
| 8,549,518 | B1 | 10/2013 | Aron et al. | |
| 8,601,473 | B1 | 12/2013 | Aron et al. | |
| 8,797,857 | B2 * | 8/2014 | Dodson | H04L 47/10 |
| | | | | 370/230 |
| 8,850,130 | B1 | 9/2014 | Aron et al. | |
| 9,680,773 | B1 * | 6/2017 | Tan | H04L 49/9005 |
| 9,772,866 | B1 | 9/2017 | Aron et al. | |
| 9,961,023 | B2 * | 5/2018 | Tsirkin | H04L 49/9005 |
| 10,601,738 | B2 * | 3/2020 | Richardson | H04L 49/901 |
| 2002/0085493 | A1 * | 7/2002 | Pekkala | H04L 47/39 |
| | | | | 370/235 |
| 2002/0087758 | A1 * | 7/2002 | Dixon | G06F 3/0613 |
| | | | | 710/56 |
| 2004/0047367 | A1 * | 3/2004 | Mammen | H04L 49/901 |
| | | | | 370/472 |
| 2005/0008011 | A1 * | 1/2005 | Georgiou | H04L 49/9078 |
| | | | | 370/389 |
| 2005/0060445 | A1 * | 3/2005 | Beukema | H04L 49/358 |
| | | | | 710/52 |
| 2006/0268708 | A1 * | 11/2006 | Speight | H04L 47/26 |
| | | | | 370/235 |
| 2010/0165842 | A1 * | 7/2010 | Wang | H04L 47/10 |
| | | | | 370/235 |
| 2010/0312941 | A1 * | 12/2010 | Aloni | H04L 49/90 |
| | | | | 710/310 |
| 2011/0216650 | A1 * | 9/2011 | Jin | H04L 12/56 |
| | | | | 370/230 |
| 2014/0304320 | A1 * | 10/2014 | Taneja | H04L 69/326 |
| | | | | 709/203 |
| 2015/0143016 | A1 * | 5/2015 | Egi | G06F 13/4221 |
| | | | | 710/313 |
| 2016/0012856 | A1 * | 1/2016 | Cave, Jr. | G11B 27/005 |
| | | | | 386/241 |
| 2018/0285227 | A1 * | 10/2018 | Sharma | G06F 11/3006 |
| 2019/0004808 | A1 * | 1/2019 | Larson | G06F 9/3851 |
| 2019/0354406 | A1 * | 11/2019 | Ganguli | G06F 9/45558 |
| 2020/0004701 | A1 * | 1/2020 | Subbarao | G06F 3/0656 |
| 2020/0159661 | A1 * | 5/2020 | Keymolen | G06F 12/0815 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Hilland, Jeff et al. "RDMA Protocol Verbs Specification (Version 1.0)" (Apr. 2003), 243 pages.

Recio, Renato. "RDMAP and DDP Overview" (Nov. 22, 2002), 9 pages.

Wikipedia. "Remote direct memory access" (Jun. 20, 2018), 2 pages.

Pinkerton, Jim. "Sockets Direct Protocol v1.0 Rdma Consortium" (Oct. 24, 2003), 32 pages.

Cano, I. et al., "Curator: Self-Managing Storage for Enterprise Clusters", *14th USENIX Symposium on Networked Systems Design and Implementation, NSDI '17*, (Mar. 27, 2017).

* cited by examiner

ELASTIC METHOD OF REMOTE DIRECT MEMORY ACCESS MEMORY ADVERTISEMENT

FIELD

This disclosure relates to computing systems, and more particularly to techniques for demand-based remote direct memory access buffer management.

BACKGROUND

Modern computing systems often comprise multiple computing nodes (e.g., servers) that work together to perform certain tasks. As such, data is often transferred between the computing nodes. The process of transferring data from a data source (e.g., a computing node sending the data) to a data sink (e.g., a computing node receiving the data) often involves multiple sub-processes that copy the data multiple times. For example, when transferring data over a packet-switched network, the data source might first copy and organize the data in a packet. The packet is then copied to the queue of a NIC at the data source. The packet is then received into the memory of a NIC at the data sink to be later copied to the memory of the data sink for access by one or more target applications.

Reducing the need for making such memory copies as well as the corresponding processing as required by the underlying operating systems has been the objective of several over-the-network memory-to-memory protocols, some of which claim to circumvent all or portions of a data transfer protocol stack, and/or all or portions of certain operating system kernel processing. One such protocol is the remote direct memory access (RDMA) protocol. The RDMA protocol facilitates direct data transfer operations between specialized RDMA-enabled NICs at the data sources and data sinks. Such specialized NICs at the data sources are configured with on-NIC pointer memory that holds the addresses of data buffers at the specialized NICs of the data sinks. As such, a data source can transfer data over a network directly to a target buffer of a data sink.

The buffers at the data sink are apportioned to comprise certain quantities of buffers of certain buffer sizes. A region of memory that comprises the buffers at the data sink is registered for RDMA use, and the individual buffer start addresses are "advertised" to a corresponding RDMA NIC of a data source. When performing a data transfer operation from source to sink, the NIC of the data source selects an available buffer by its size. For example, when sending an RDMA message with a 6 kB payload, an available 8 kB buffer can be used, or when sending an RDMA message with a 1.7 MB payload, an available 2 MB buffer can be used. Buffers are often made available in predefined sizes, such as powers of two, for example 4 k, 8 k, 16 k, etc.

Unfortunately, using the aforementioned technique to apportion certain quantities of buffers of certain buffer sizes at the data sink may not match the buffer sizes and/or quantities demanded by data sources. For example, a data sink might allocate a region of memory that is then statically apportioned into eight 4 kB buffers, eight 8 kB buffers, and eight 2 MB buffers that are advertised to a particular data source. However, the data source might have data transfer operations that use only the 4 kB buffers and the 8 kB buffers (e.g., due to the mix of workloads at the data source)—but without demand for the eight 2 MB buffers. In this case, the memory allocated for the eight 2 MB buffers is unused, leading to inefficient use of the memory at the data sink. Still worse than the mere inefficient use of sink memory, in periods of high usage of the 4 kB and 8 kB buffers the data source might have to wait for the data sink to re-advertise such buffers. Waiting for buffer availability and incurring corresponding processing delays negates the low latency benefits of the remote direct memory access protocol. What is needed is technological solution for apportioning buffers to improve memory utilization and/or reduce remote direct memory access transaction delays.

SUMMARY

The present disclosure describes techniques used in systems, methods, and in computer program products for demand-based remote direct memory access buffer advertisement, which techniques advance the relevant technologies to address technological issues with legacy approaches. More specifically, the present disclosure describes techniques used in systems, methods, and in computer program products for dynamically re-apportioning remote direct memory access protocol buffers based on observed buffer demand. Certain embodiments are directed to technological solutions for monitoring the payload size of remote direct memory access protocol messages to dynamically adjust the apportionment (e.g., size, quantity, etc.) of advertised buffers to match the observed demand.

The disclosed embodiments modify and improve over legacy approaches. In particular, the herein-disclosed techniques provide technical solutions that address the technical problems attendant to underutilization of statically-apportioned buffers. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, when performing operations pertaining to dynamically re-apportioning RDMA buffers based on observed buffer demand both memory usage and CPU cycles demanded are significantly reduced as compared to the memory usage and CPU cycles that would be needed but for practice of the herein-disclosed techniques for monitoring the payload size of RDMA messages to dynamically adjust the apportionment (e.g., size, quantity, etc.) of advertised RDMA buffers to match the observed demand.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of high performance computing as well as advances in various technical fields related to distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
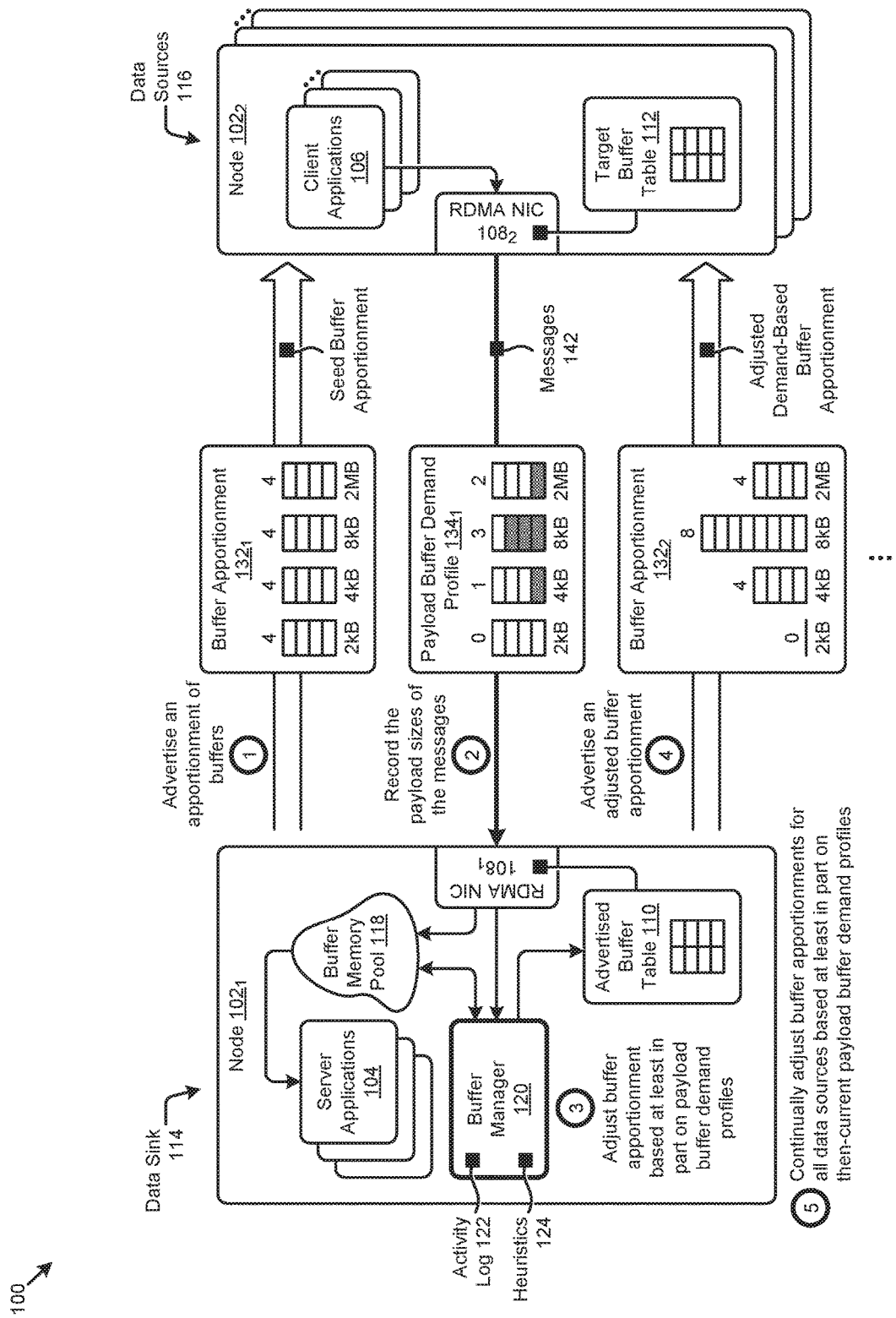
FIG. 1 illustrates a computing environment in which embodiments of the present disclosure can be implemented.

Embodiments in accordance with the present disclosure address the problem of underutilization of statically-apportioned RDMA buffers. Some embodiments are directed to approaches for monitoring the payload size of RDMA messages to dynamically adjust the apportionment (e.g., size, quantity, etc.) of advertised RDMA buffers to match the observed demand. The accompanying figures and discussions herein present example environments, systems, methods, and computer program products for dynamically re-apportioning RDMA buffers based on observed buffer demand.

Overview

Disclosed herein are techniques for monitoring the payload size of RDMA messages to dynamically adjust the apportionment (e.g., size, quantity, etc.) of advertised RDMA buffers. In certain embodiments, a memory pool at a data sink is registered to facilitate RDMA data transfer operations from one or more data sources. The memory pool is partitioned into chunks (e.g., contiguous memory areas) where each chunk comprises buffers of a particular size (e.g., 4 kB, 8 kB, 16 kB, 32 kB, 2 MB etc.). An initial apportionment of the buffers (e.g., a seed buffer apportionment) is advertised to each of the data sources. For example, four buffers of each buffer size might be initially advertised to the data sources. Messages corresponding to RDMA data transfer operations that consume one or more of the buffers are sent from the data sources to the data sink. The payload size of the messages from the data sources are logged to determine payload buffer demand profiles for the data sources. The payload buffer demand profiles of the data sources are analyzed to determine adjustments to the buffer apportionments. The adjusted demand-based buffer apportionment is then advertised to the data sources. In certain embodiments, one or more advertised buffers are reclaimed from the data sources. In certain embodiments, heuristics are applied to determine the adjustments. In certain embodiments, one or more chunks are reconfigured for a different buffer size to facilitate adjustments to the buffer apportionment. In certain embodiments, additional memory is allocated to the memory pool to facilitate adjustments to the buffer apportionment.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to monitoring the payload size of RDMA messages to dynamically adjust the apportionment (e.g., size, quantity, etc.) of advertised RDMA buffers to match the observed demand. Specifically, the figure presents a logical depiction of how the herein disclosed techniques can be implemented in a computing environment (e.g., a distributed computing environment) to perform dynamic re-apportioning of RDMA buffers based on observed buffer demand.

The logical depiction of FIG. 1 illustrates two representative computing nodes (e.g., node $102_1$ and node $102_2$) with RDMA-enabled NICs (e.g., RDMA NIC $108_1$ and RDMA NIC $108_2$, respectively) for performing RDMA data transfer operations. As used herein, a node is a computing device attached to one or more links of a network. For example, a node might comprise a physical appliance or virtual machine having a physical or virtual RDMA-enabled NIC. In the example embodiment shown in computing environment 100, node $102_1$ serves as a data sink 114 associated with the RDMA data transfers, and node $102_2$ serves as one of a plurality of data sources 116 associated with the RDMA data transfers. As such, one or more instances of client applications (e.g., client applications 106) at the data sources 116 can transfer data over the RDMA protocol to one or more instances of server applications 104 at data sink 114. In accordance with the RDMA protocol, any of the foregoing nodes that have established an RDMA connection (e.g., transport-level connection) can assume the role of a local peer, remote peer, data sink, or data source.

To facilitate the RDMA data transfers, buffers of varying quantities and sizes from a buffer memory pool 118 at data sink 114 are advertised to the data sources 116 (e.g., node $102_2$). The advertised buffers are recorded in an advertised buffer table 110 at data sink 114 and subsets of the advertised buffers that are apportioned to each data source are recorded in a local instance of a target buffer table (e.g., target buffer table 112). Instances of messages 142 issued from the data sources 116 to the data sink 114 to carry out the RDMA data transfers consume one or more of the advertised buffers. Specifically, a data source will select one or more buffers from its local target buffer table based at least in part on the payload size of a particular RDMA data transfer operation. The selected target buffer(s), the data payload, and/or other information are codified in a message that is sent to the data sink 114.

As earlier mentioned, however, approaches to determining the buffer apportionments that are advertised to the data sources can be deficient. Specifically, the buffer sizes and quantities of a statically-apportioned buffers may not match the buffer sizes and/or quantities demanded by the data sources. Such static apportionments can result in low utilization of buffer memory pool 118 and/or increased RDMA data transfer operations latencies.

The herein disclosed techniques address such problems attendant to underutilization of statically-apportioned RDMA buffers by monitoring the payload size of RDMA messages to dynamically adjust the apportionment (e.g., size, quantity, etc.) of advertised RDMA buffers. As shown in FIG. 1, a buffer manager 120 at data sink 114 determines an initial apportionment (e.g., the shown seed buffer apportionment) of the buffers from buffer memory pool 118 to advertise to the data sources 116 (operation 1). For example, as indicated by a buffer apportionment $132_1$, four buffers of each of a plurality of buffer sizes (e.g., 2 kB, 4 kB, 8 kB, and 2 MB) might be initially advertised to the data source at node $102_2$. Instances of messages 142 corresponding to RDMA data transfer operations that consume one or more of the buffers are sent from the data sources to the data sink. The payload size of the messages 142 from data sources 116 are recorded in an activity log 122 accessible by buffer manager 120 (operation 2). The recorded payload sizes are analyzed to determine payload buffer demand profiles for data sources 116. As an example, a payload buffer demand profile $134_1$ associated with the data source at node $102_2$ indicates that the data source demanded none of the 2 kB buffers, one of the 4 kB buffers, three of the 8 kB buffers, and two of the 2 MB buffers. The herein disclosed techniques consider a buffer demand derived from the payload size rather than merely tracking the buffer consumption. This approach eliminates false usage indications that might arise from certain buffer usage scenarios, such as a scatter-gather scenario.

The payload buffer demand profiles of data sources 116 are analyzed to determine adjustments to the buffer apportionments (operation 3). The adjusted demand-based buffer apportionment is then advertised to the data sources 116 (operation 4). In some cases, a set of heuristics 124 are applied to the payload buffer demand profiles to determine the adjustments to the buffer apportionments. For example, as shown in a buffer apportionment $132_2$ associated with the data source at node $102_2$, a heuristic might double the quantity (e.g., count) of 8 kB buffers advertised to the data source in response to the demand (e.g., three) for the buffers reaches or exceeds half of the quantity (e.g., four) of buffers earlier advertised. As further indicated in buffer apportionment $132_2$, the quantity of some buffers (e.g., 2 kB buffers) might be reduced based at least in part on the payload buffer demand profiles, whereas the quantity of other buffers (e.g., 4 kB buffers, 2 MB buffers) might remain unchanged based at least in part on the payload buffer demand profiles. The buffer apportionments are continually adjusted by buffer manager 120 based at least in part on the then-current payload buffer demand profiles (operation 5).

The demand-based RDMA buffer management capabilities facilitated by the herein disclosed techniques result in improvements in computer functionality that serve to reduce the demand for computer processing power, reduce the demand for computer memory and data storage, reduce network bandwidth use, and reduce the demand for inter-component communication, in virtualization environments. Specifically, applications of the herein disclosed techniques improve the utilization of the memory resources of the buffer memory pool (e.g., buffer memory pool 118). Furthermore, applications of the herein disclosed techniques reduce the CPU resources consumed by certain operations (e.g., scatter-gather operations) that are invoked in response to buffer shortages. Moreover, since at least a portion of the herein-disclosed techniques are performed on each node of any RDMA network, the reduction of resources scales with the size of the RDMA network, thus leading to network wide improvements.

One embodiment of techniques for demand-based RDMA buffer apportionment is disclosed in further detail as follows.

Figure 2:
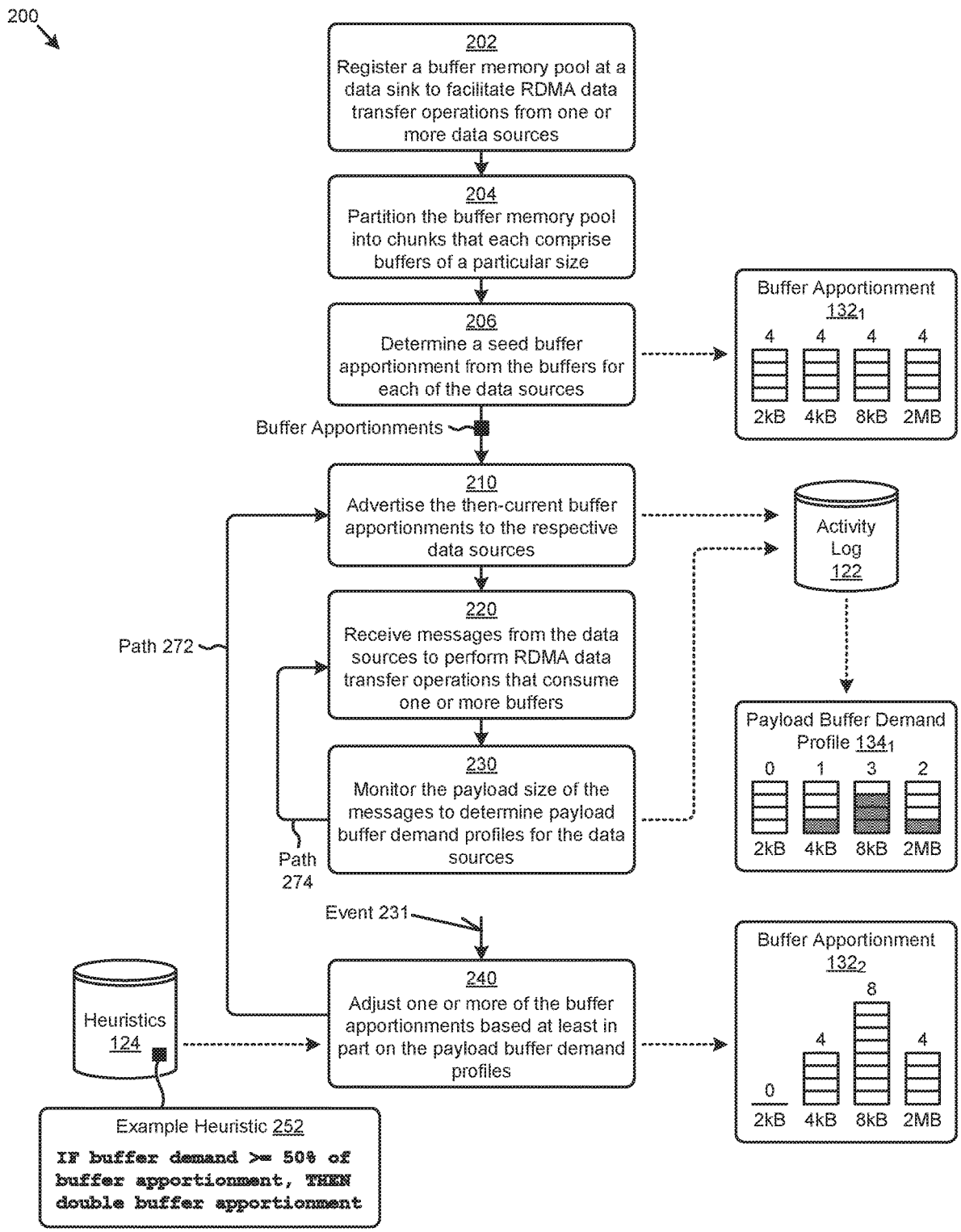
FIG. 2 depicts a demand-based buffer apportionment technique as implemented in systems that dynamically re-apportion buffers based on observed buffer demand.

FIG. 2 depicts a demand-based buffer apportionment technique 200 as implemented in systems that dynamically re-apportion buffers based on observed buffer demand. As an option, one or more variations of demand-based buffer apportionment technique 200 or any aspect thereof may be implemented in the context of the architecture and functionality of the embodiments described herein. The demand-based buffer apportionment technique 200 or any aspect thereof may be implemented in any environment. In particular, the shown and described techniques for demand-based buffer apportionment can be used for any environment that supports remote direct memory access, of which the RDMA protocol is merely one illustrative example. Still more particularly, there can be many remote direct memory access techniques that use a specialized network stack (e.g., other than TCP/IP) to move data from a data source directly into a particular region of memory (e.g., RAM) of a data sink without forming IP packets and/or without intervention by an operating system kernel on the data sink side. Moreover, any of the foregoing environments serve to support one or more techniques to monitor the payload size of data movements. As such, any of the foregoing environments can be configured to dynamically adjust the apportionment of buffers based on observed buffer demand.

FIG. 2 illustrates one aspect pertaining to monitoring the payload size of RDMA messages to dynamically adjust the apportionment (e.g., size, quantity, etc.) of advertised RDMA buffers to match the observed demand. Specifically, the figure is presented to illustrate one embodiment of certain steps and/or operations for dynamically re-apportioning RDMA buffers based on observed buffer demand. A representative scenario is also shown in the figure to illustrate an example application of the demand-based RDMA buffer apportionment technique 200.

The demand-based RDMA buffer apportionment technique 200 can commence by registering a buffer memory pool at a data sink to facilitate RDMA data transfer operations from one or more data sources (step 202). The registration process establishes, for example, the memory access permissions and address mapping that facilitate use of the memory region comprising the buffer memory pool by an RDMA-enabled NIC. The buffer memory pool is partitioned into one or more chunks that each comprise buffers of a particular size (step 204). For example, a first chunk might comprise 4 kB buffers, a second chunk might comprise 8 kB buffers, and so on. A seed buffer apportionment comprising a portion of the buffers from the chunks is determined for each of the data sources (step 206). As illustrated, a seed buffer apportionment for a particular data source might be represented by the buffer apportionment $132_1$ earlier described.

The then-current buffer apportionments, which at an initial time are the seed buffer apportionments, are advertised to the respective data sources (step 210). Such advertisements might be issued in accordance with a certain advertisement schedule. As indicated by path 272, such advertisement schedules can coordinate with adjustments to the buffer apportionments as performed according to the herein disclosed techniques. As can observed, the advertisements and underlying buffer apportionments can be recorded in the activity log 122 for later processing. Messages corresponding to RDMA data transfer operations that consume one or more of the buffers apportioned to the data sources are received (step 220). The payload sizes of the messages are monitored to determine buffer demand profiles for the data sources (step 230). For example, the payload sizes of messages from a particular data source might be recorded in activity log 122 and later analyzed to generate the payload buffer demand profile $134_1$. The process of recording the payload sizes of received messages can be a continuous process as indicated by path 274.

Periodically, or upon some event 231, the buffer demand profiles derived from the recorded message payload sizes are analyzed to adjust one or more of the buffer apportionments associated with the data sources (step 240). Iterations through path 274 continues even during the analysis of step 240. In some cases, during processing of step 240, a set of heuristics 124 are consulted to determine the adjustments to the buffer apportionments. As shown in an example heuristic 252, if buffer demand is greater than or equal to 50 percent of the then-current buffer apportionment (e.g., of a particular buffer size for a particular data source), then the buffer apportionment is doubled. As an application of example heuristic 252, the buffer demand of three 8 kB buffers indicated in payload buffer demand profile $134_1$ results in an increase in the 8 kB buffer apportionment from four 8 kB buffers in buffer apportionment $132_1$ to eight 8 kB buffers in buffer apportionment $132_2$.

One embodiment of a system, data flows, and data structures for implementing the demand-based RDMA buffer apportionment technique 200 and/or other herein disclosed techniques is disclosed as follows.

Figure 3:
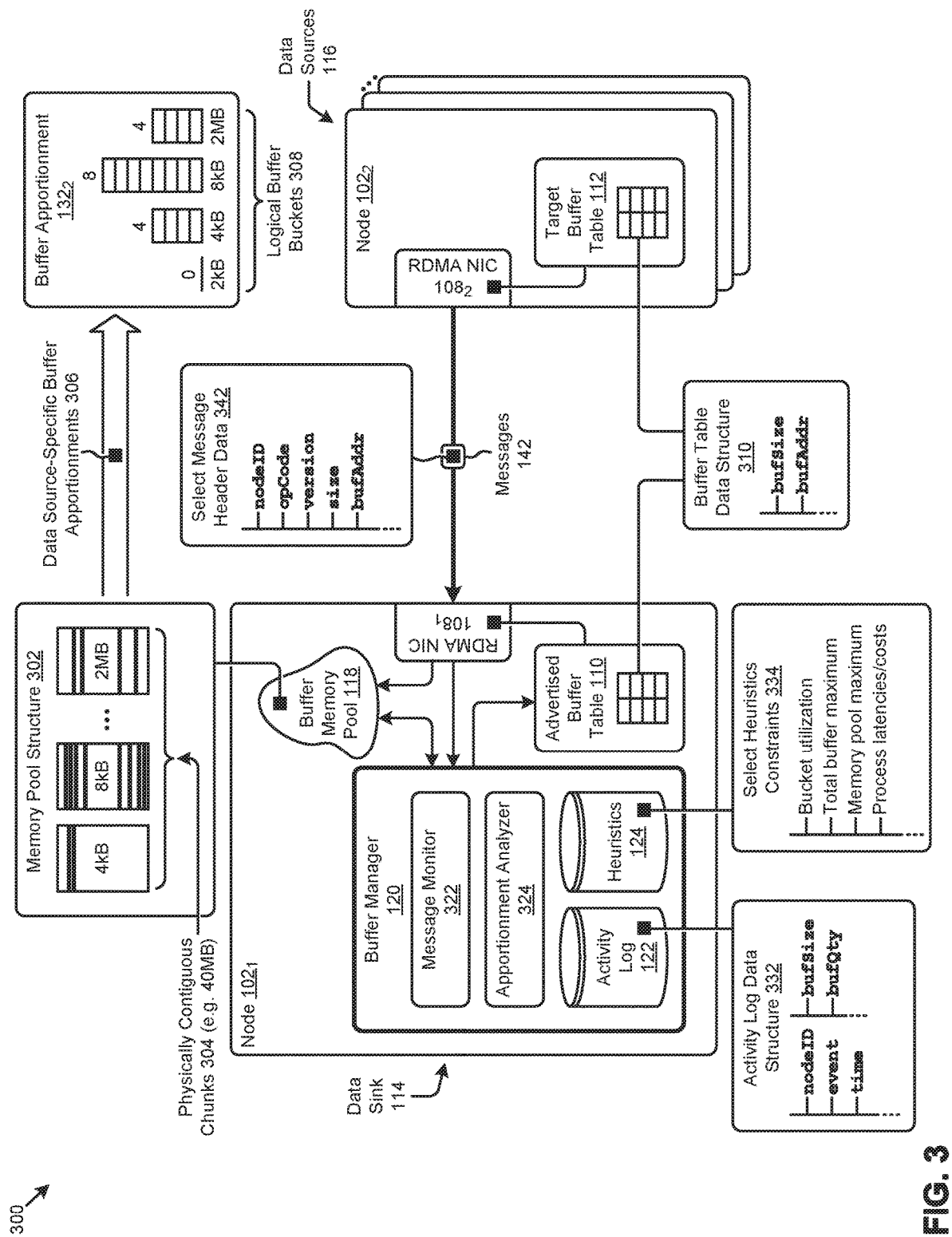
FIG. 3 is a block diagram of a computing system that dynamically re-apportions RDMA buffers based on observed buffer demand.

FIG. 3 is a block diagram of a computing system 300 that dynamically re-apportions RDMA buffers based on observed buffer demand. As an option, one or more variations of computing system 300 or any aspect thereof may be implemented in the context of the architecture and functionality of the embodiments described herein. The computing system 300 or any aspect thereof may be implemented in any environment.

FIG. 3 illustrates one aspect pertaining to monitoring the payload size of RDMA messages to dynamically adjust the apportionment (e.g., size, quantity, etc.) of advertised RDMA buffers to match the observed demand. Specifically, the figure is being presented to show one embodiment of certain representative components and associated data flows that describes how the herein disclosed techniques might be implemented in a distributed computing environment. Also illustrated is a set of specialized data structures that improve the way a computer uses data in memory when performing steps pertaining to dynamically re-apportioning RDMA buffers based on observed buffer demand. The components, data flows, and data structures shown in FIG. 3 present one partitioning and associated data manipulation approach. The specific example shown is purely exemplary, and other subsystems, data structures, and/or partitioning are reasonable.

As shown, computing system 300 comprises several components earlier described. Specifically shown are node $102_1$ comprising RDMA NIC $108_1$, buffer memory pool 118, and advertised buffer table 110, and node $102_2$ comprising RDMA NIC $108_2$ and target buffer table 112. In the example embodiment of computing system 300, RDMA data transfer operations are facilitated by messages 142 issued from one or more instances of data sources 116 (e.g., node $102_2$) to a data sink 114 (e.g., node $102_1$).

The herein disclosed techniques are facilitated in computing system 300 at least in part by implementing the buffer manager 120 at node $102_1$. The buffer manager 120 can perform certain memory management operations, such as organizing the buffer memory pool 118 according to a memory pool structure 302. As can be observer, memory pool structure 302 can comprise a plurality of physically contiguous chunks 304 that each are assigned to a particular buffer size (e.g., "4 kB", "8 kB", . . . , "2 MB"). The assignment of a chunk to a buffer size can be performed in response to an initial request for allocating one or more buffers of a particular size. As an example, a 400 MB memory region might be allocated and registered as the buffer memory pool 118 for RDMA data transfer operations. In this case, the buffer memory pool 118 might be partitioned into 10 40 MB chunks, with each chunk assigned to a buffer size spanning 4 kB to 2 MB by a factor of two (e.g., buffer size of $2^{12+k}$ bytes, where k=0-9). As such, for example, the "4 kB" chunk will have 10,000 4 kB buffers available, the "8 kB" chunk will have 5,000 buffers available, and the "2 MB" chunk will have 20 buffers available.

The buffer manager 120 apportions selected buffers from the chunks to respective instances of the data sources 116 that are connected to the data sink 114 comprising the buffer manager 120. The buffer apportionment $132_2$ is one example of such data source specific buffer apportionments 306. As can be observed, buffer apportionment $132_2$ comprises a set of logical buffer buckets 308 that each comprise a certain quantity of buffers that are apportioned (e.g., advertised to) a particular data source. For example, a "2 kB" bucket might comprise no buffers, a "4 kB" bucket might comprise four buffers, an "8 kB" bucket might comprise eight buffers, and a "2 MB" bucket might comprise four buffers.

Information pertaining to the buffers apportioned and advertised from the buffer memory pool 118 are stored in advertised buffer table 110. Information pertaining to the buffers advertised to a particular data source (e.g., node $102_2$) are stored in a local instance of target buffer table 112. One embodiment of a data structure for storing such information in any of the buffer tables is described in a buffer table structure 310. As shown, the buffer information might be stored in a key-value structure, with the key corresponding to a buffer size (e.g., stored in a "bufSize" field), and the value corresponding to the buffer address (e.g., stored in a "bufAddr" field). Other data structures are possible for organizing and/or storing the buffer information and/or any data that facilitates the herein disclosed techniques. For example, buffer information might be organized and/or stored in a tabular structure (e.g., relational database table) that has rows that relate various user attributes with a particular buffer. As another example, the information might be organized and/or stored in a programming code object that has instances corresponding to a particular buffer and properties corresponding to the various attributes associated with the buffer.

When a data source prepares a message to perform an RDMA data transfer operation, one or more buffers from the target buffer table 112 are selected based at least in part on the payload size of the operation. In many cases, a single buffer that is greater than or equal to the size of the payload is selected. In some cases, when such a buffer is not available, the data source might deploy a scatter-gather technique to use multiple smaller buffers to accommodate the payload. In other cases, no advertised buffers that can accommodate the payload are available to the data source. In these cases, the RDMA data transfer operation remains in the queue until which time a sufficient quantity and/or size of buffers are available to accommodate the payload of the operation.

The messages 142 submitted from the data sources 116 to the data sink 114 comprise certain header information, such as shown in a representative set of select message header data 342. As shown, a message header might include a node identifier (e.g., stored in a "nodeID" filed), message opcode (e.g., stored in an "opcode" field), an RDMA protocol version (e.g., stored in a "version" field), a payload size (e.g., stored in a "size" field), a target buffer address (e.g., stored in a "bufAddr" field), and/or other information pertaining to the message. The target buffer address in the message header is often copied, without interpretation, directly from the target buffer table 112 or, in some cases, a read request from data sink 114. An offset to the target buffer address might also be included in the message header.

A message monitor 322 at buffer manager 120 accesses the headers of incoming messages to extract at least the node identifier and payload size to facilitate the herein disclosed techniques. The extracted header information is recorded in the activity log 122 according to an activity log data structure 332. As depicted in activity log data structure 332, a data record (e.g., table row or object instance) for a particular activity might describe a node identifier (e.g., stored in a "node ID" field), an event type (e.g., stored in an "event" field), a timestamp (e.g., stored in a "time" field), an advertised or calculated buffer size (e.g., stored in a "bufSize" field), an advertised or calculated buffer quantity (e.g., stored in a "bufQty" field), and/or other activity attributes. As an example, a message from node $102_2$ with a payload size of 3 kB might produce an entry in activity log 122 populated as follows: nodeID=n102-2, event=demand, time=1532036474879, bufSize=4 kB, and bufQty=1. The activity log data structure 332 can also facilitate logging of advertised buffer apportionments. In this case, a set of data records in activity log 122 associated with a particular advertisement schedule might have "event" fields set to "advert" and "bufSize" and "bufQty" fields set according to the then-current buffer apportionments for the data sources (e.g., identified by the "nodeID" field).

An apportionment analyzer 324 at buffer manager 120 accesses such "demand" and "advert" event data records in activity log 122 to adjust one or more of the then-current buffer apportionments according to the herein disclosed techniques. Specifically, buffer demand profiles derived from the "message" event data records are analyzed to determine adjustment to the then-current buffer apportionments as codified in the "advert" event data records. The apportionment analyzer 324 might consult the heuristics 124 to determine such adjustments. A set of heuristics (e.g., rules, rule base) such as heuristics 124 comprises data records storing various information that can be used to form one or more constraints to apply to certain functions and/or operations. For example, the information pertaining to a heuristic might comprise the conditional logic operands (e.g., input variables, conditions, constraints, etc.) and/or operators (e.g., "if", "then", "and", "or", "greater than", "less than", etc.) for forming a conditional logic statement that returns one or more results. As shown in a set of select heuristics constraints 334, aspects pertaining to "bucket utilization" (e.g., 50 percent), "total buffer maximum" (e.g., 40 MB), "memory pool maximum" (e.g., 1 GB), "process latencies" (e.g., in µs), and "process costs" (e.g., in USD$) the might be considered when determining adjustments to buffer apportionments.

Techniques for the aforementioned demand-based adjustments to buffer apportionments (e.g., step 240 of FIG. 2) are disclosed in further detail as follows.

Figure 4A:
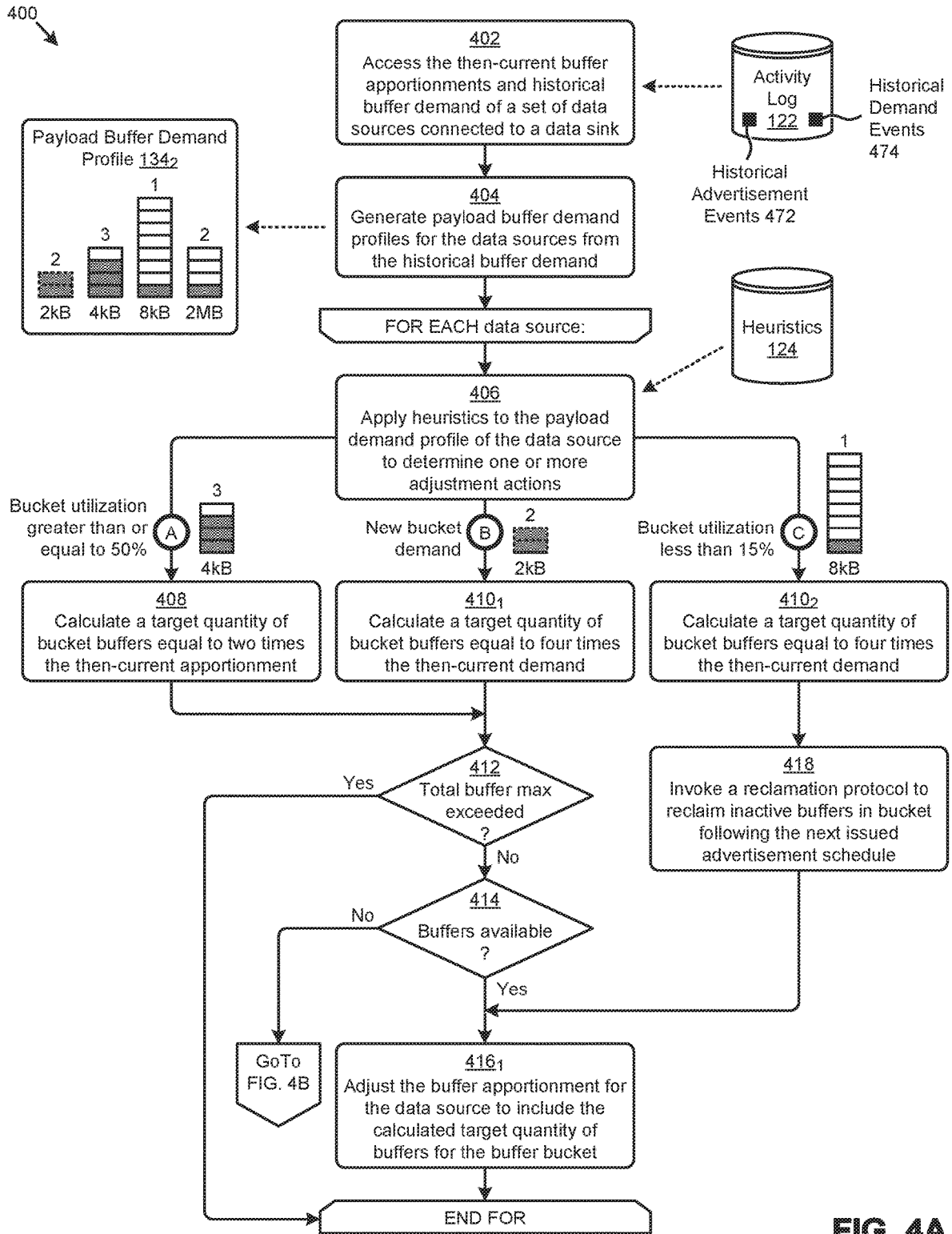
FIG. 4A and FIG. 4B present a buffer apportionment adjustment technique as implemented in systems that implement dynamic re-apportionment of RDMA buffers based on observed buffer demand.
Figure 4B:
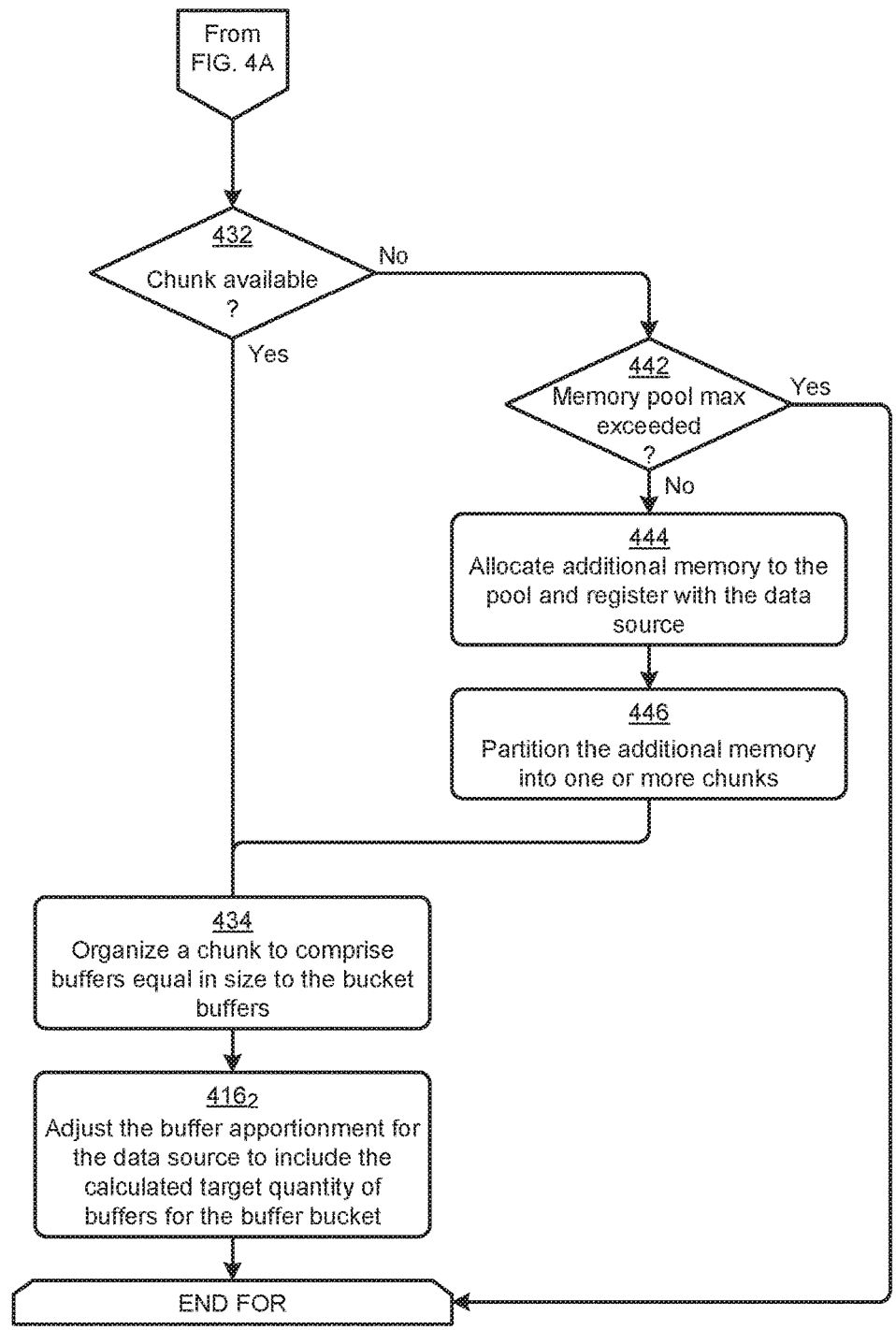

FIG. 4A and FIG. 4B present a buffer apportionment adjustment technique 400 as implemented in systems that implement dynamic re-apportionment of RDMA buffers based on observed buffer demand. As an option, one or more variations of buffer apportionment adjustment technique 400 or any aspect thereof may be implemented in the context of the architecture and functionality of the embodiments described herein. The buffer apportionment adjustment technique 400 or any aspect thereof may be implemented in any environment.

FIG. 4A and FIG. 4B illustrate one aspect pertaining to monitoring the payload size of RDMA messages to dynamically adjust the apportionment (e.g., size, quantity, etc.) of advertised RDMA buffers to match the observed demand. Specifically, the figure is presented to illustrate one embodiment of certain steps and/or operations for performing demand-based adjustments to buffer apportionments. A representative scenario is also shown in the figure to illustrate at least a portion of an example application of the buffer apportionment adjustment technique 400.

Referring to FIG. 4A, the buffer apportionment adjustment technique 400 can commence by accessing the then-current buffer apportionments and historical buffer demand of a set of data sources connected to data sink (step 402). As shown, for example, the then-current buffer apportionments can be identified from a set of historical advertisement events 472 recorded in an activity log 122. A set of historical demand events 474 that capture the buffer demand associated with historical RDMA data transfer operations might also be recorded in the activity log 122. Payload buffer demand profiles for the data sources are generated from the historical buffer demand (step 404). As an example, a payload buffer demand profile might comprise a histogram, such as shown in payload buffer demand profile 134$_2$, of the historical buffer demand since the time the then-current buffer apportionments were advertised. Such payload buffer demand profiles are generated for each buffer bucket of each data source.

For each of the data sources, a set of heuristics (e.g., heuristics 124) is applied to the generated payload demand profiles of the data source to determine one or more adjustment actions (step 406). Three representative adjustment actions (e.g., action "A", action "B", and action "C") are shown in FIG. 4A, but other adjustment actions are possible. Action "A" is invoked when a heuristic detects bucket utilization breaches a usage threshold (e.g., greater than or equal to 50 percent). Action "B" is invoked when a heuristic detects there is demand for a bucket that does not currently exist. Action "C" is invoked when a heuristic detects that a bucket utilization breaches a disuse threshold (e.g., bucket utilization is less than 15 percent).

Responsive to invoking action "A", a target quantity of bucket buffers equal to two times the then-current apportionment for that bucket is calculated (step 408). For example, when applying a "THEN double buffer apportionment" rule, a target quantity of eight is calculated for the "4 kB" buffer bucket shown in payload buffer demand profile 134$_2$. In response to invoking action "B", a target quantity of bucket buffers equal to four times the then-current demand for that bucket is calculated (step 410$_1$). As an example, a target quantity of eight is calculated for the "2 kB" buffer bucket shown in payload buffer demand profile 134$_2$. In this case, the buffer demand is derived from the historical message payload sizes rather than the historical buffer usage since the then-current buffer apportionment does not include a "2 kB" bucket.

For both action "A" and action "B", the cumulative buffer size for the data source, including the calculated target quantity of buffers, is compared to the total buffer maximum allowed for the data source (decision 412). If the total buffer maximum is exceeded (see "Yes" path of decision 412), no further operations are performed. If the total buffer maximum is not exceeded (see "No" path of decision 412) and buffers of an appropriate size are available (see "Yes" path of decision 414), then the buffer apportionment for the data source is adjusted to include the calculated target quantity of buffers for the buffer bucket (e.g., eight "4 kB" buffers, eight "2 kB" buffers, etc.) (step 416$_1$). If no buffers of an appropriate size are available (see "No" path of decision 414), then various operations to provision more buffers can be performed, as discussed as pertaining to FIG. 4B.

In response to invoking action "C" shown in FIG. 4A, a target quantity of bucket buffers equal to four times the then-current demand for that bucket is calculated (step 410$_2$). As an example, a target quantity of four is calculated for the "8 kB" buffer bucket shown in payload buffer demand profile 134$_2$. Since the buffer bucket quantity is reduced in this case, a reclamation protocol is invoked to reclaim any inactive buffers in the bucket following the next issued advertisement schedule (step 418). Furthermore, reducing the buffer bucket quantity eliminates a need for any checks pertaining to total buffer maximums or buffer availability, and the buffer apportionment for the data source can be adjusted to include the calculated target quantity of buffers for the buffer bucket (e.g., four "8 kB" buffers) (step 416$_1$).

Referring to FIG. 4B, if no buffers of an appropriate size are available to add to a particular buffer bucket, the chunks in a buffer memory pool can be checked for availability. A chunk is "available" if it is currently not assigned to and/or organized to comprise one or more advertised buffers. If a chunk is available (see "Yes" path of decision 432), the identified chunk is organized to comprise buffers equal in size to the bucket buffers (step 434). With buffers now available, the buffer apportionment for the data source can be adjusted to include the calculated target quantity of buffers for the buffer bucket (step 416$_2$). If no chunks are available (see "No" path of decision 432) and the memory pool maximum is not exceeded (see "No" path of decision 442), then additional memory allocated to the buffer memory pool is registered for RDMA data transfer operations (step 444). The additional memory is then partitioned into at least one chunk (step 446) that can be organized to comprise the needed buffers (step 434) to accommodate adjustments to the buffer apportionment (step 416$_2$). In cases where the memory pool maximum is exceeded (see "Yes" path of decision 442), no further operations are performed.

The foregoing discussions include techniques for reclaiming inactive buffers from a data source (e.g., step 418 of FIG. 4A), which techniques are disclosed in further detail as follows.

Figure 5:
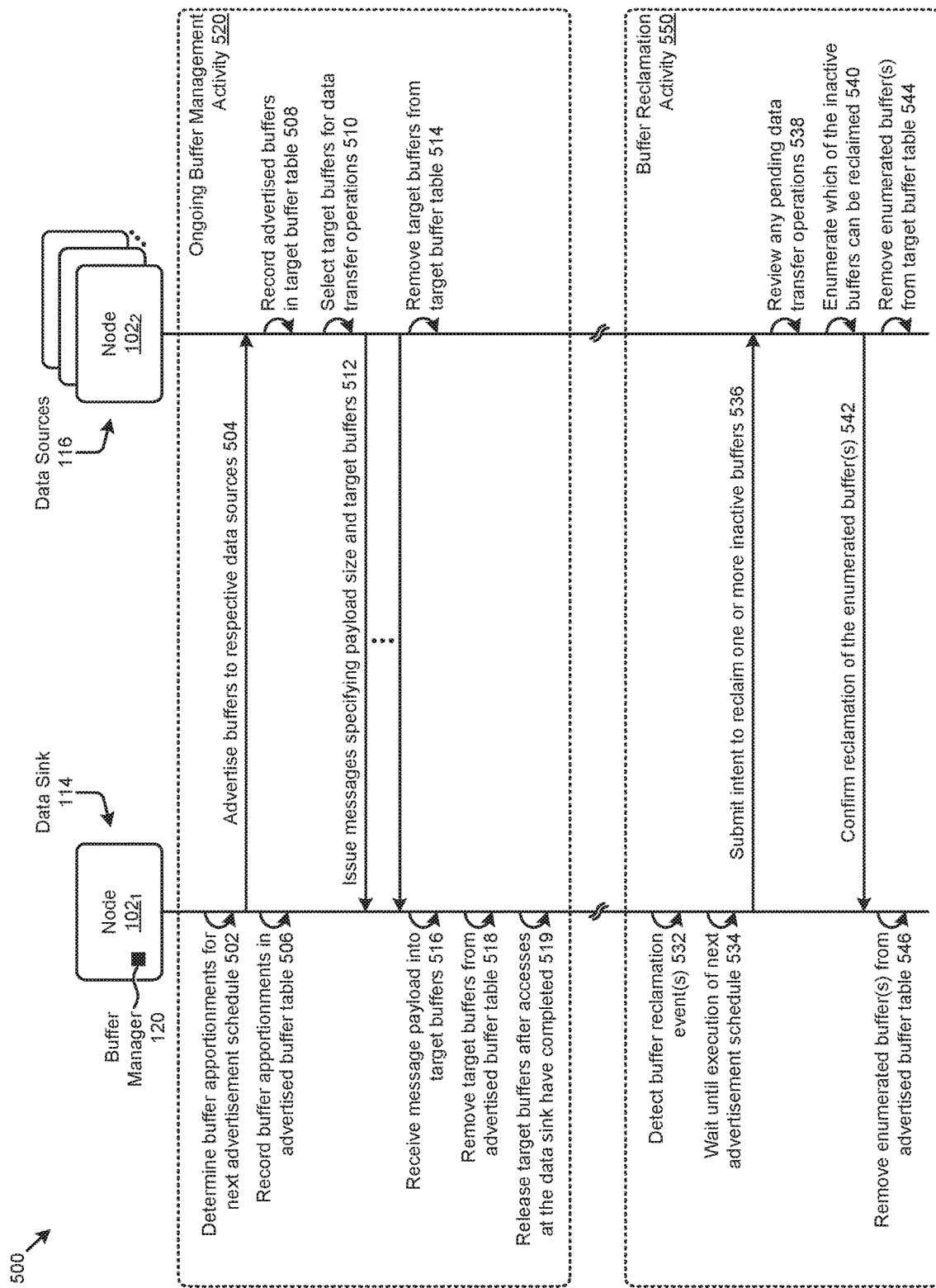
FIG. 5 illustrates a buffer reclamation technique as implemented in systems that implement dynamic re-apportionment of RDMA buffers based on observed buffer demand.

FIG. 5 illustrates a buffer reclamation technique 500 as implemented in systems that implement dynamic re-apportionment of RDMA buffers based on observed buffer demand. As an option, one or more variations of buffer reclamation technique 500 or any aspect thereof may be implemented in the context of the architecture and functionality of the embodiments described herein. The buffer reclamation technique 500 or any aspect thereof may be implemented in any environment.

FIG. 5 illustrates one aspect pertaining to monitoring the payload size of RDMA messages to dynamically adjust the apportionment (e.g., size, quantity, etc.) of advertised RDMA buffers to match the observed demand. Specifically, the figure is being presented to depict a set of high order interactions (e.g., operations, messages, etc.) exhibited by various computing components earlier described that in part comprise one embodiment of a protocol for reclaiming one or more advertised RDMA buffers from a data source. The particular computing components shown in FIG. 5 are node 102$_1$, representing a data sink 114, and node 102$_2$, representing one instance of a set of data sources 116. As shown, the interactions between the foregoing components can be categorized as a set of ongoing buffer management activity 520 that provides the context for a set of buffer reclamation activity 550.

The ongoing buffer management activity 520 can commence with certain buffer apportionments being determined for a later issued buffer advertisement schedule (operation 502). For example, a buffer manager 120 at node 102$_1$ might determine the buffer apportionments based at least in part on observed payload buffer demand profiles in accordance with the herein disclosed techniques. The buffers associated with the buffer apportionments are advertised to the respective data sources (message 504). The advertised buffers are recorded in an advertised buffer table at the data sink 114 (operation 506) and at local instances of a target buffer table at the data sources (operation 508). The target buffer tables are accessed to select one or more target buffers to receive the payload of data transfer operations from the data sources (operation 510). RDMA messages that specify the payload size and the selected target buffers are issued from the data source 116 to the data sink 114 (message 512, etc.). As the messages are issued, the target buffers consumed are removed from the target buffer tables at the data sources (operation 514).

The payloads of the messages are received into the target buffers the data sink 114 (operation 516), and such target buffers are removed (e.g., "popped off") from the advertised buffer table (operation 518). Any process (e.g., of any one of the server applications 104 of FIG. 1) can then access the payload. When the process has concluded access of the payload (operation 519), the process can then release the corresponding target buffer or buffers such that the target buffer or buffers can be advertised in a subsequent advertisement event.

As the foregoing operations and/or messages are continually executed as part of the ongoing buffer management activity 520, opportunities can arise to reclaim certain advertised buffers from one or more data sources. For example, a data source might show a buffer demand at the time of a first advertisement schedule that calls for large quantity of buffers in a certain buffer bucket, but then, at the later time of a second advertisement schedule (e.g., during the ongoing buffer management activity 520), have a reduced demand for buffers in that bucket. In this case, one or more earlier advertised buffers in the bucket might be deemed "inactive". For example, a heuristic might identify an inactive buffer as an advertised buffer that is not consumed over some period of time. Such inactive buffers can be reclaimed for apportioning to other data sources in accordance with the techniques described herein.

As depicted in FIG. 5, such buffer reclamation activity 550 can commence with detecting one or more buffer reclamation events (operation 532). A buffer reclamation event might be invoked by a certain process at buffer manager 120 at node 102₁ which identifies a set of inactive buffers to reclaim. When the next advertisement schedule is executed (operation 534), an intent to reclaim one or more inactive buffers is submitted to the data sources associated with the inactive buffers (message 536). The data sources will review the pending data transfer operations to identify any of the inactive buffers that might be selected to facilitate the pending data transfer operations (operation 538). The buffers from the set of inactive buffers that can be reclaimed are enumerated (operation 540). In many cases, the enumerated buffers comprise the entire set of inactive buffers as specified in the intent to reclaim from the data sink. In other cases, such as when a portion of the inactive buffers are selected for use by one or more pending data transfer operations, the enumerated buffers can comprise a subset of the inactive buffers. When the buffers available for reclamation are enumerated, a confirmation identifying the enumerated buffers as reclaimable is issued from the data sources to the data sink (message 542). In response to the foregoing confirmation, the information pertaining to the enumerated buffers are removed from the local instances of the target buffer table at the data sources (operation 544) and from the advertised buffer table at the data sink (operation 546). By removing the buffer information from the buffer tables, the buffers become available to apportion to other data sources according to the herein disclosed techniques.

Additional Embodiments of the Disclosure

Additional Practical Application Examples

Figure 6A:
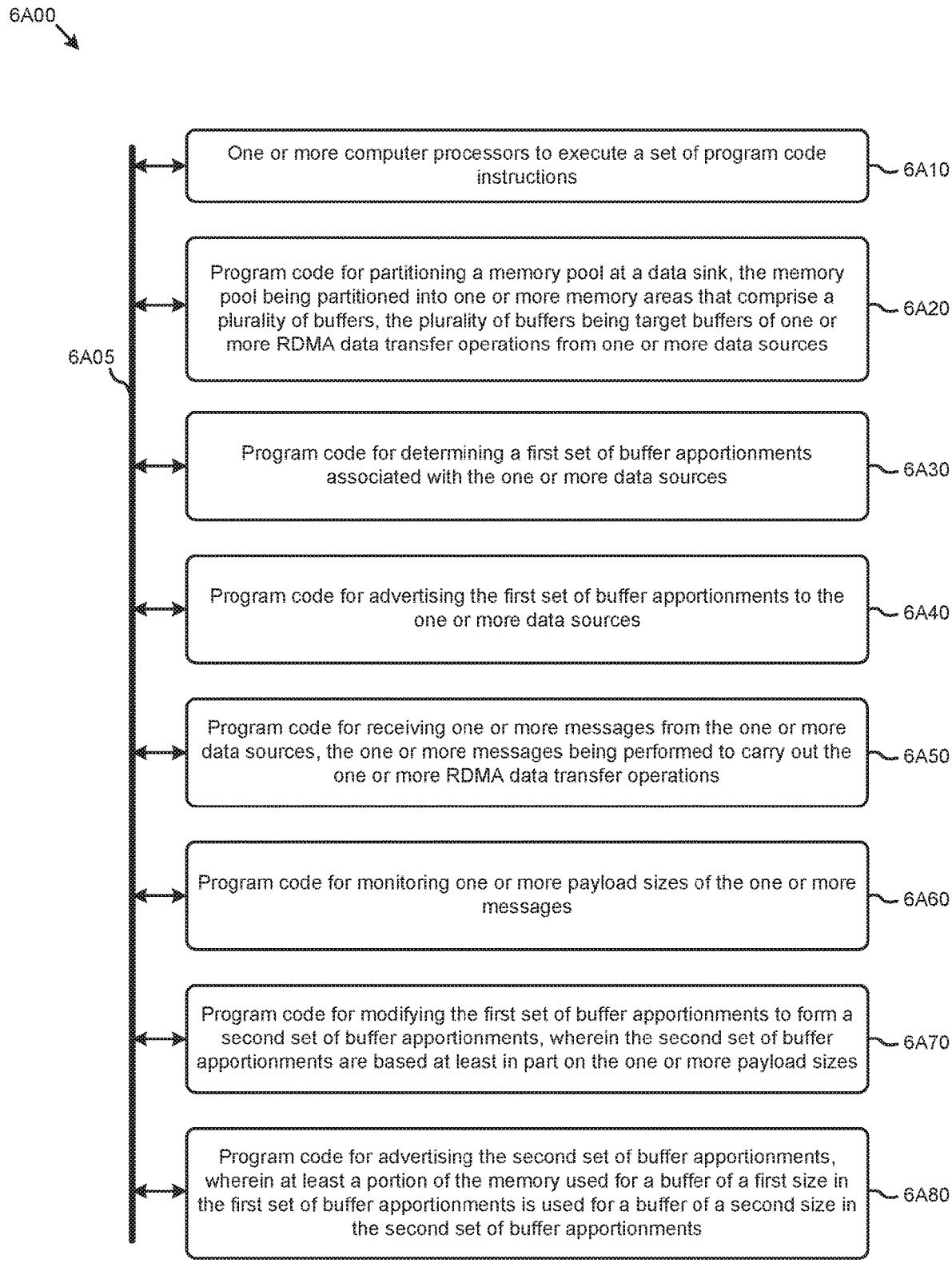
FIG. 6A, FIG. 6B, and FIG. 6C depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually and/or as combined, serve to form improved technological processes that address underutilization of statically-apportioned RDMA buffers. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising one or more computer processors to execute a set of program code instructions (module 6A10) and modules for accessing memory to hold program code instructions to perform: partitioning a memory pool at a data sink, the memory pool being partitioned into one or more memory areas that comprise a plurality of buffers, the plurality of buffers being target buffers of one or more RDMA data transfer operations from one or more data sources (module 6A20); determining a first set of buffer apportionments associated with the one or more data sources (module 6A30); advertising the first set of buffer apportionments to the one or more data sources (module 6A40); receiving one or more messages from the one or more data sources, the one or more messages being performed to carry out the one or more RDMA data transfer operations (module 6A50); monitoring one or more payload sizes of the one or more messages (module 6A60); modifying the first set of buffer apportionments to form a second set of buffer apportionments, wherein the second set of buffer apportionments are based at least in part on the one or more payload sizes (module 6A70); and advertising the second set of buffer apportionments, wherein at least a portion of the memory used for a buffer of a first size in the first set of buffer apportionments is used for a buffer of a second size in the second set of buffer apportionments (module 6A80). The constituent buffers in any further advertisements can grow or shrink. In cases of shrinking, the data sink reclaims previously advertised buffers from the data source end of the connection. Additional steps pertaining to reclamation and shrinking include buffer bucket management operations so as to cease advertising the buffers corresponding to the buffers that had been reclaimed from the data source end of the connection. The memory corresponding to the reclaimed buffers can be used for other purposes such as to constitute buffers of a different size. The different size or sizes of such constituted buffers can be determined based on observed payload sizes.

Variations of the foregoing may include more or fewer of the shown modules. Certain variations may perform more or fewer (or different) steps and/or certain variations may use data elements in more or in fewer (or different) operations.

Still further, some embodiments include variations in the operations performed, and some embodiments include variations of aspects of the data elements used in the operations.

Figure 6B:
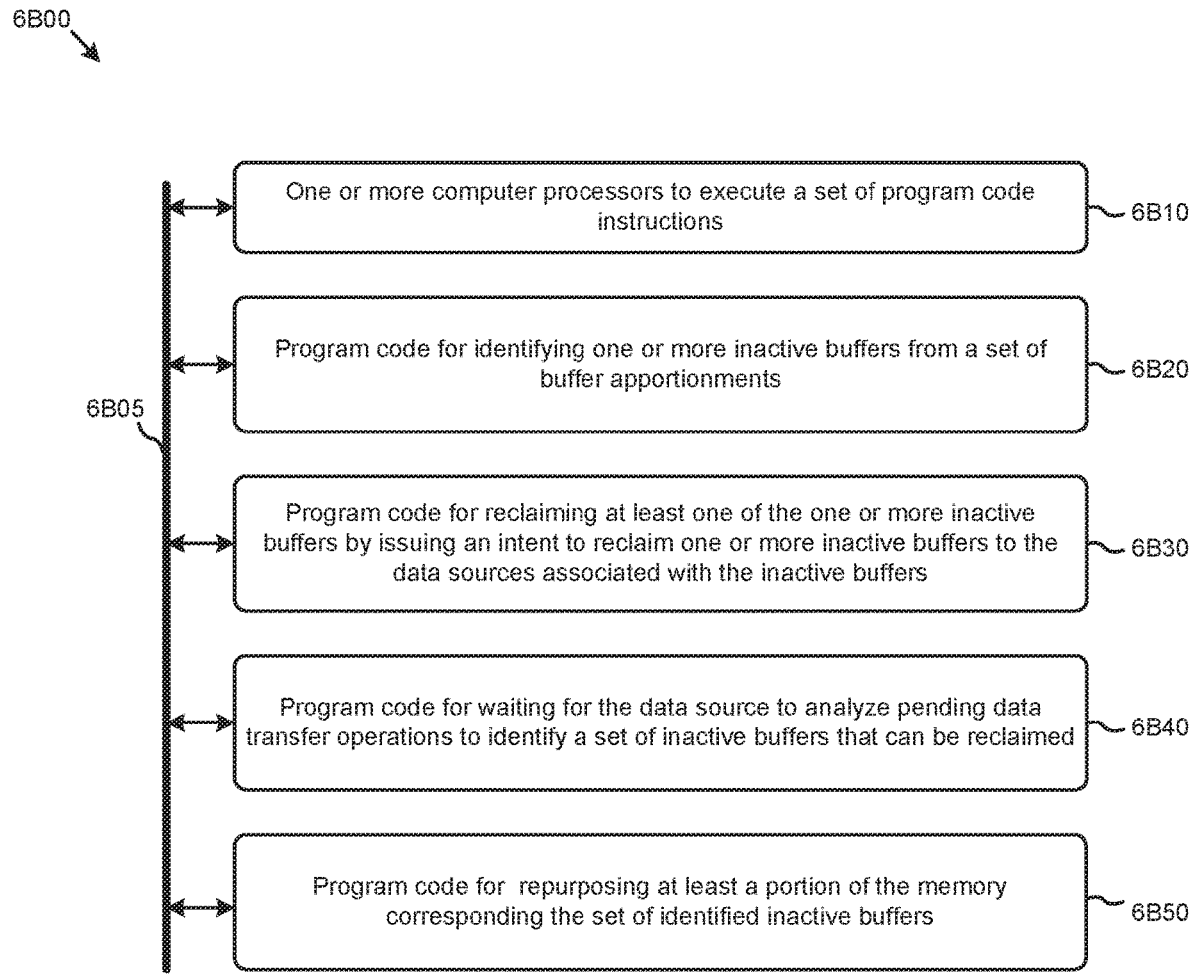

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising one or more computer processors to execute a set of program code instructions (module 6B10) and modules for accessing memory to hold program code instructions to perform: identifying one or more inactive buffers from a set of buffer apportionments (module 6B20); reclaiming at least one of the one or more inactive buffers by issuing an intent to reclaim one or more inactive buffers to the data sources associated with the inactive buffers (module 6B30); waiting for the data source to analyze pending data transfer operations to identify a set of inactive buffers that can be reclaimed (module 6B40); and repurposing at least a portion of the memory corresponding the set of identified inactive buffers that can be reclaimed (module 6B50). In some cases, memory corresponding to the set of identified inactive buffers is repurposed such that the memory corresponding to the set of identified inactive buffers is used for buffers of a different size than the size of the identified inactive buffers.

Figure 6C:
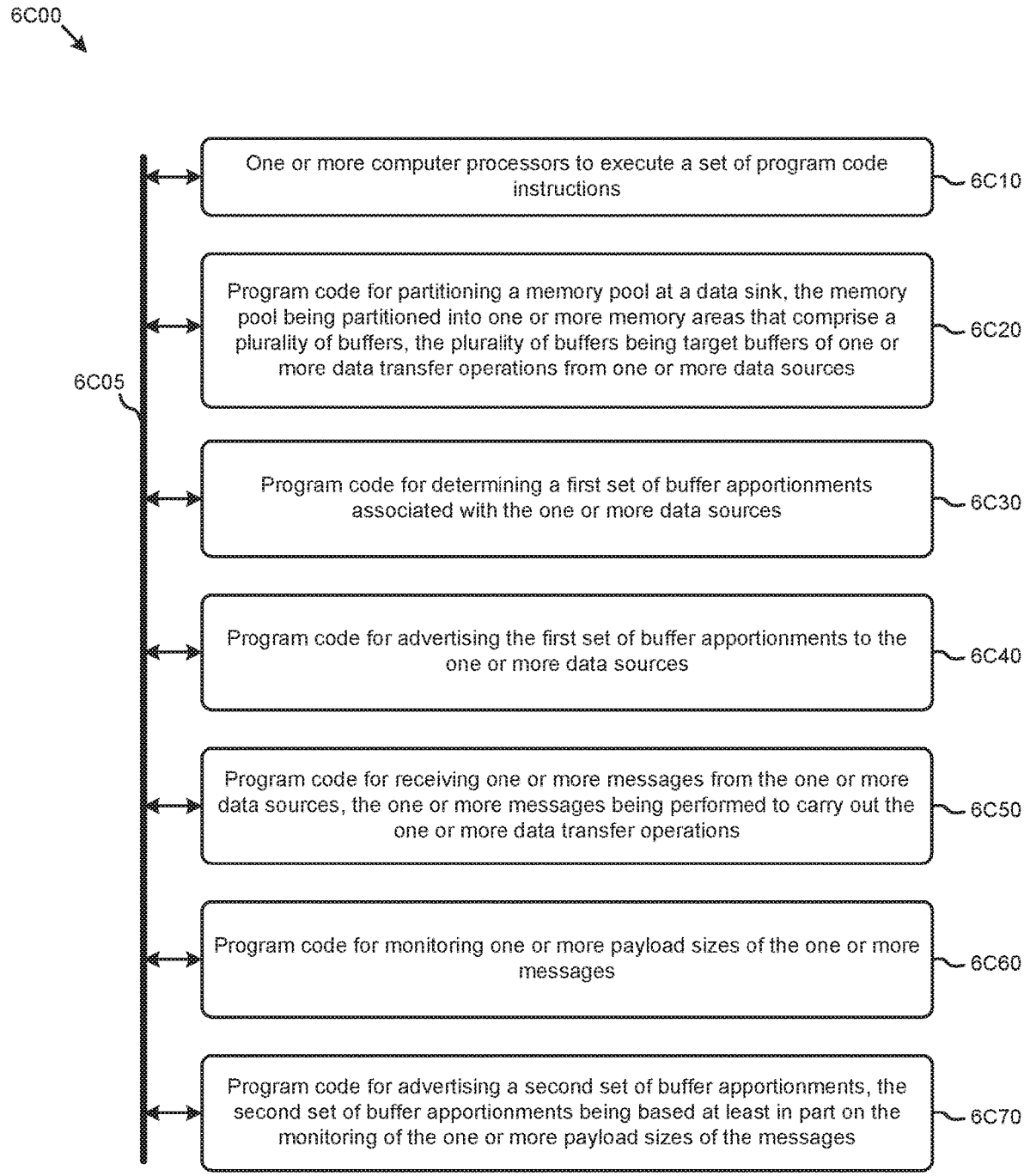

FIG. 6C depicts a system 6C00 as an arrangement of computing modules that are interconnected so as to operate cooperatively to implement certain of the herein-disclosed embodiments. The partitioning of system 6C00 is merely illustrative and other partitions are possible. As an option, the system 6C00 may be implemented in the context of the architecture and functionality of the embodiments described herein. Of course, however, the system 6C00 or any operation therein may be carried out in any desired environment. The system 6C00 comprises at least one processor and at least one memory, the memory serving to store program instructions corresponding to the operations of the system. As shown, an operation can be implemented in whole or in part using program instructions accessible by a module. The modules are connected to a communication path 6C05, and any operation can communicate with other operations over communication path 6C05. The modules of the system can, individually or in combination, perform method operations within system 6C00. Any operations performed within system 6C00 may be performed in any order unless as may be specified in the claims. The shown embodiment implements a portion of a computer system, presented as system 6C00, comprising one or more computer processors to execute a set of program code instructions (module 6C10) and modules for accessing memory to hold program code instructions to perform: partitioning a memory pool at a data sink, the memory pool being partitioned into one or more memory areas that comprise a plurality of buffers, the plurality of buffers being target buffers of one or more data transfer operations from one or more data sources (module 6C20); determining a first set of buffer apportionments associated with the one or more data sources (module 6C30); advertising the first set of buffer apportionments to the one or more data sources (module 6C40); receiving one or more messages from the one or more data sources, the one or more messages being performed to carry out the one or more data transfer operations (module 6C50); monitoring one or more payload sizes of the one or more messages (module 6C60); and advertising a second set of buffer apportionments, the second set of buffer apportionments being based at least in part on the monitoring of the one or more payload sizes of the messages (module 6C70).

System Architecture Overview

Additional System Architecture Examples

Figure 7A:
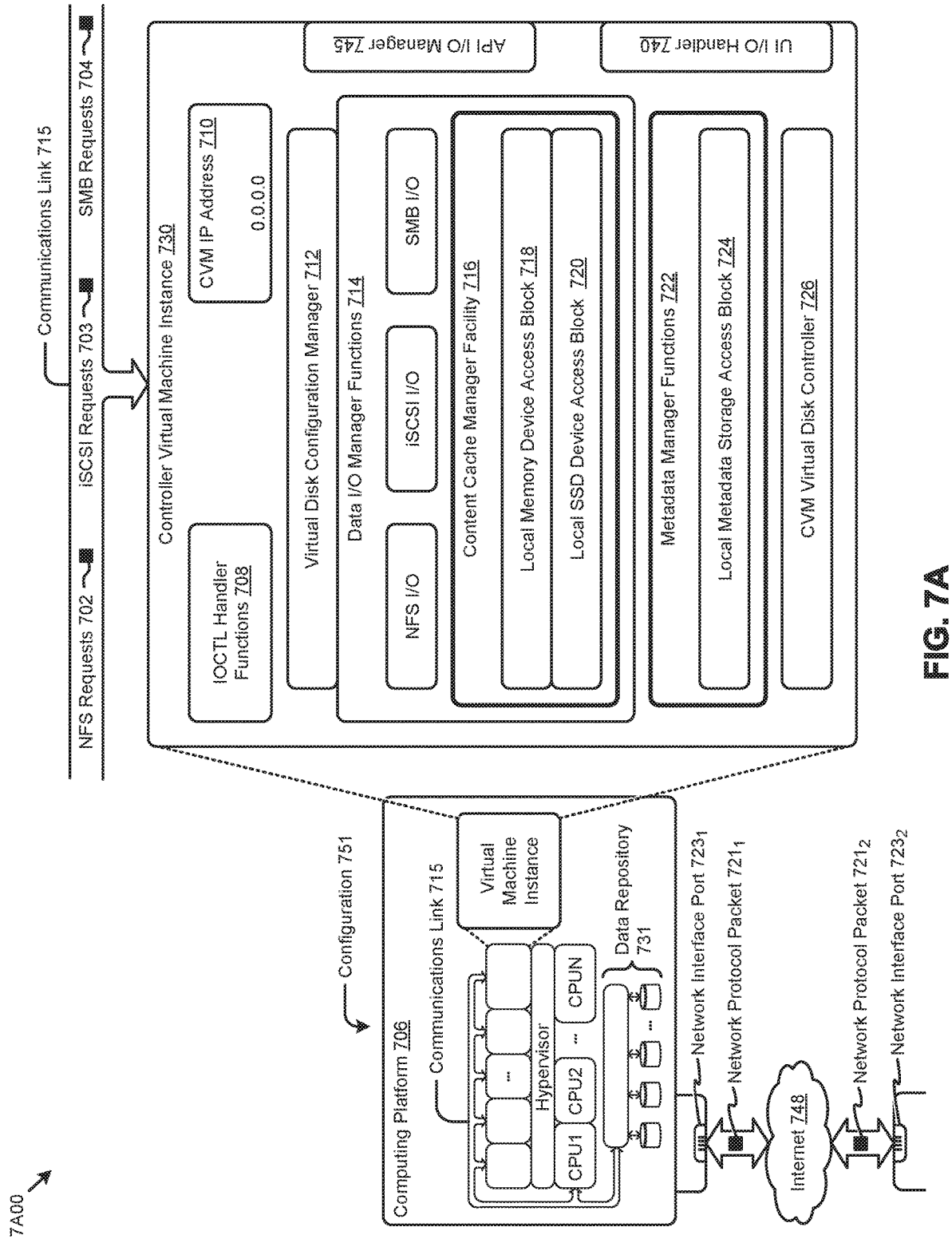
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or JO) as received from any or every source within the computing platform. An example implementation of such a virtual machine that processes storage I/O is depicted as 730.

In this and other configurations, a controller virtual machine instance receives block I/O (input/output or JO) storage requests as network file system (NFS) requests in the form of NFS requests 702, and/or internet small computer storage interface (iSCSI) block JO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or JO) can be handled by one or more JO control handler functions (e.g., IOCTL handler functions 708) that interface to other functions such as data JO manager functions 714 and/or metadata manager functions 722. As shown, the data JO manager functions can include communication with virtual disk configuration manager 712 and/or can include direct or indirect communication with any of various block TO functions (e.g., NFS IO, iSCSI IO, SMB IO, etc.).

In addition to block TO functions, configuration 751 supports TO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API TO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or the results of executing program code can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/ or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to dynamically re-apportioning RDMA buffers based on observed buffer demand. In some embodiments, a module may include one or more state machines and/or combinational logic used to implement or facilitate the operational and/or performance characteristics pertaining to dynamically re-apportioning RDMA buffers based on observed buffer demand.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamically re-apportioning RDMA buffers based on observed buffer demand). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to dynamically re-apportioning RDMA buffers based on observed buffer demand, and/or for improving the way data is manipulated when performing computerized operations pertaining to monitoring the payload size of RDMA messages to dynamically adjust the apportionment (e.g., size, quantity, etc.) of advertised RDMA buffers to match the observed demand.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
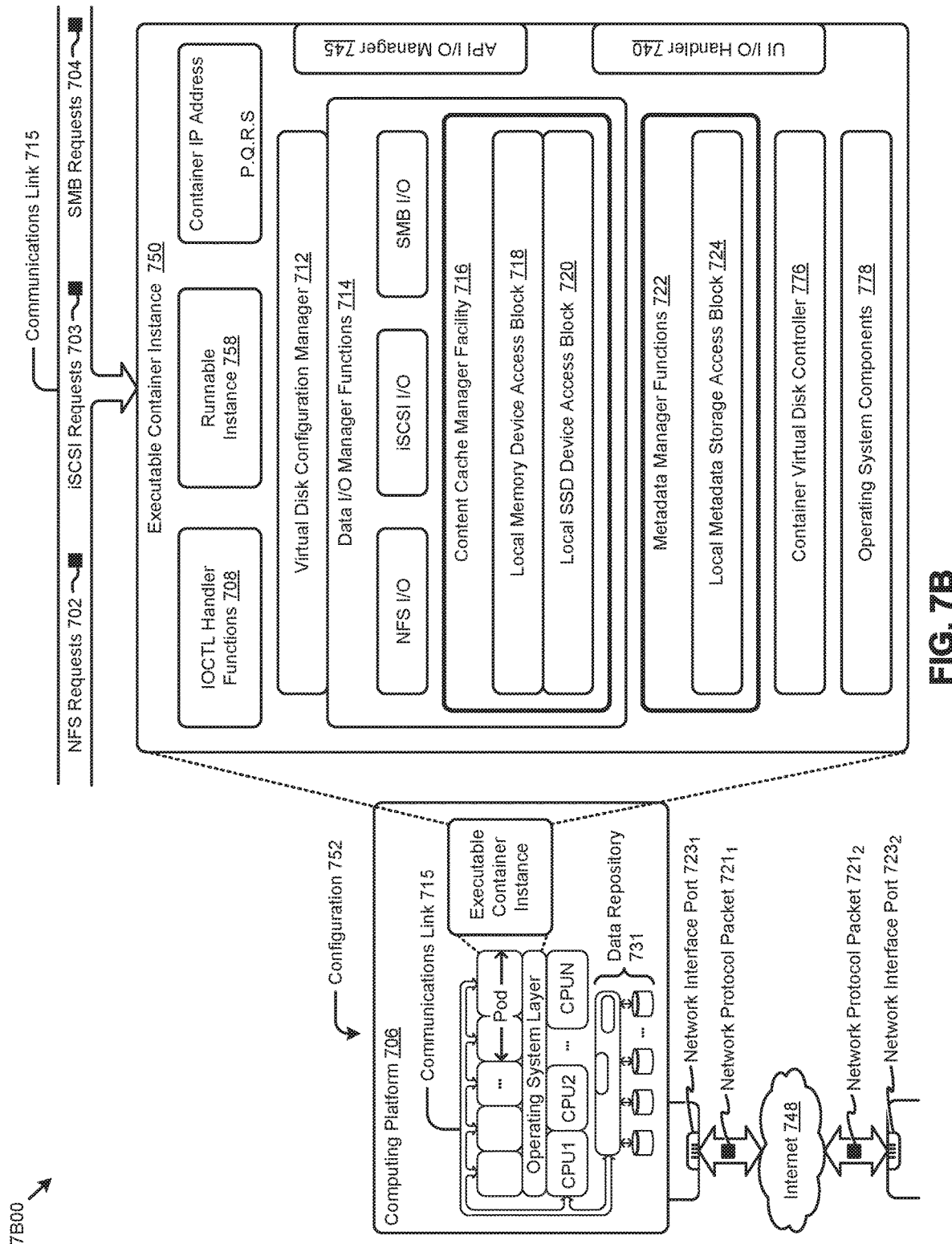

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
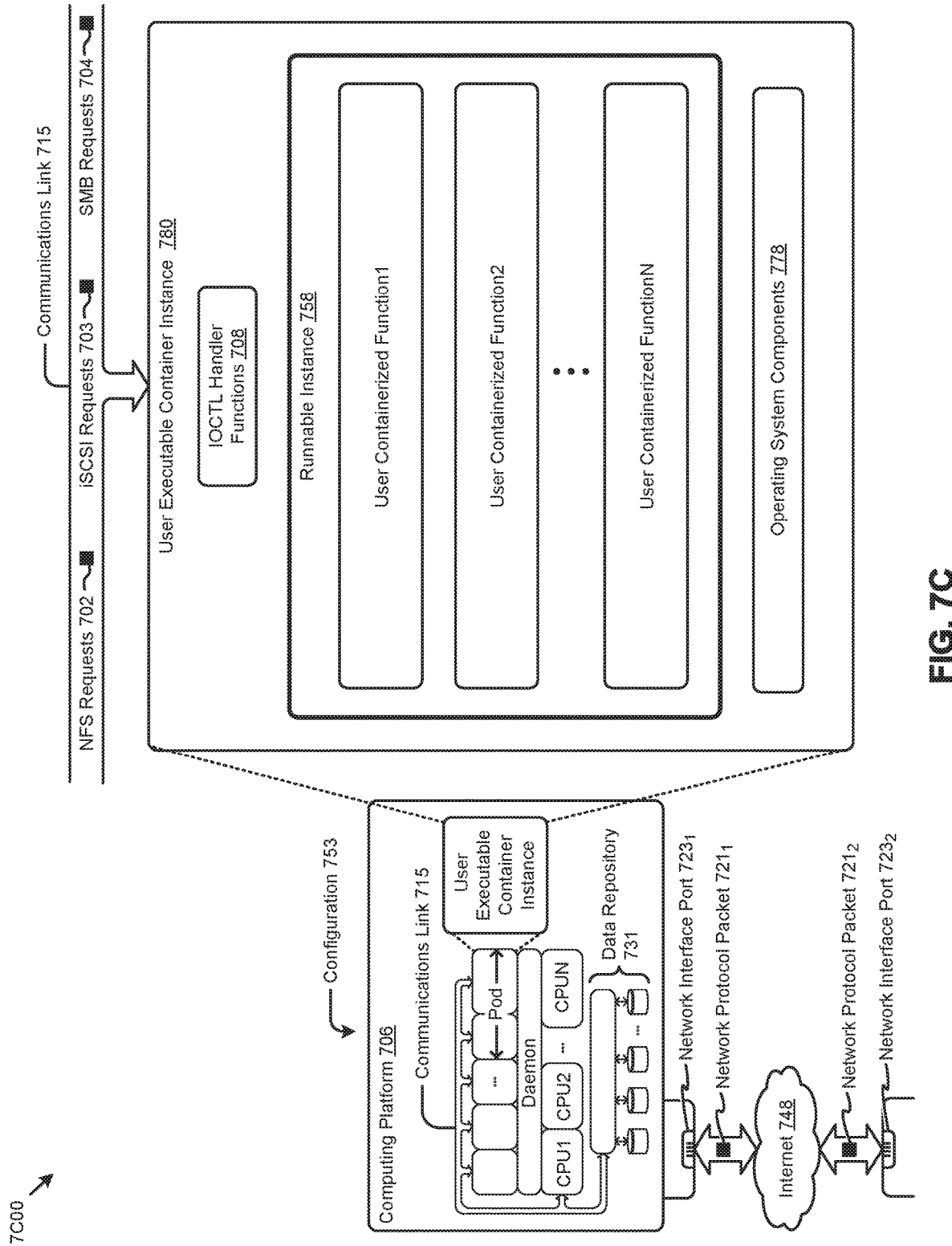

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   partitioning a memory pool for storing payloads at a data sink, the memory pool being partitioned into a plurality of buffers;
   determining a first apportionment of the plurality of buffers, wherein the first apportionment includes buffers having different sizes;
   advertising the first apportionment to a data source;
   monitoring a payload size from the data source; and
   advertising a second apportionment, the second apportionment being based at least in part on monitoring of the payload size.

2. The method of claim 1, further comprising:
   generating a payload buffer demand profile, the payload buffer demand profile being generated based at least in part on the payload size, and determining the second apportionment based at least in part on the payload buffer demand profile.

3. The method of claim 1, further comprising:
   identifying an inactive buffer from the first apportionment, and reclaiming the inactive buffer.

4. The method of claim 1, wherein the second apportionment is determined based at least in part on a heuristic and the heuristic is based at least in part on at least one of: a bucket utilization, a total buffer maximum, a memory pool maximum, a process latency, or a process cost.

5. The method of claim 1, wherein the memory pool is for facilitating a remote direct memory access data transfer operation.

6. The method of claim 1, wherein the memory pool is reorganized to accommodate the second apportionment.

7. The method of claim 1, wherein the memory pool is increased to accommodate the second apportionment.

8. The method of claim 1, wherein at least one of: the payload size, the first apportionment, or the second apportionment, is recorded in an activity log.

9. A non-transitory computer readable medium having stored thereon a sequence of instructions which, when executed by a processor causes the processor to perform a set of acts comprising:
   partitioning a memory pool for storing payloads at a data sink, the memory pool being partitioned into a plurality of buffers;
   determining a first apportionment of the plurality of buffers, wherein the first apportionment includes buffers having different sizes;
   advertising the first apportionment to a data source;
   monitoring a payload size from the data source; and
   advertising a second apportionment, the second apportionment being based at least in part on monitoring of the payload size.

10. The computer readable medium of claim 9, wherein the set of acts further comprise:
    generating a payload buffer demand profile, the payload buffer demand profile being generated based at least in part on the payload size, and determining the second apportionment based at least in part on the payload buffer demand profile.

11. The computer readable medium of claim 9, wherein the set of acts further comprise:
    identifying an inactive buffer from the first apportionment, and reclaiming the inactive buffer.

12. The computer readable medium of claim 11, wherein the memory pool is increased to accommodate the second apportionment.

13. The computer readable medium of claim 9, wherein the second apportionment is determined based at least in part on a heuristic and the heuristic is based at least in part on at least one of: a bucket utilization, a total buffer maximum, a memory pool maximum, a process latency, or a process cost.

14. The computer readable medium of claim 13, wherein at least one of: the payload size, the first apportionment, or the second apportionment, is recorded in an activity log.

15. The computer readable medium of claim 9, wherein the memory pool is for facilitating a remote direct memory access data transfer operation.

16. The computer readable medium of claim 9, wherein the memory pool is reorganized to accommodate the second apportionment.

17. A system comprising:
    a storage medium having stored thereon a sequence of instructions; and
    a processor that executes the sequence of instructions to cause a set of acts comprising,
       partitioning a memory pool for storing payloads at a data sink, the memory pool being partitioned into a plurality of buffers;
       determining a first buffer apportionment of the plurality of buffers, wherein the first apportionment includes buffers having different sizes;
       advertising the first apportionment to a data source;

monitoring a payload size from the data source; and advertising a second buffer apportionment, the second apportionment being based at least in part on monitoring of the payload size.

18. The system of claim 17, wherein the set of acts further comprise:

identifying an inactive buffer from the first apportionment, and reclaiming the inactive buffer.

19. The system of claim 17, wherein the set of acts further comprise:

generating a payload buffer demand profile, the payload buffer demand profile being generated based at least in part on the payload size, and determining the second apportionment based at least in part on the payload buffer demand profile.

20. The system of claim 17, wherein the second apportionment is determined based at least in part on a heuristic and the heuristic is based at least in part on at least one of:

a bucket utilization, a total buffer maximum, a memory pool maximum, a process latency, or a process cost.

21. The system of claim 17, wherein the memory pool is for facilitating a remote direct memory access data transfer operation.

22. The system of claim 17, wherein the memory pool is reorganized to accommodate the second apportionment.

23. The system of claim 17, wherein the memory pool is increased to accommodate the second apportionment.

24. The system of claim 17, wherein at least one of: the payload size, the first apportionment, or the second apportionment, is recorded in an activity log.

* * * * *